Jan. 22, 1957  C. T. OGLESBY  2,778,414
TIRE PULLER ASSEMBLY WITH CIRCUMFERENTIALLY
DISTRIBUTED THRUST MEMBERS
Filed June 7, 1955  4 Sheets-Sheet 1

Charles T. Oglesby
INVENTOR.

BY
Attorneys

Jan. 22, 1957
C. T. OGLESBY
2,778,414
TIRE PULLER ASSEMBLY WITH CIRCUMFERENTIALLY
DISTRIBUTED THRUST MEMBERS
Filed June 7, 1955
4 Sheets-Sheet 2
Fig. 2
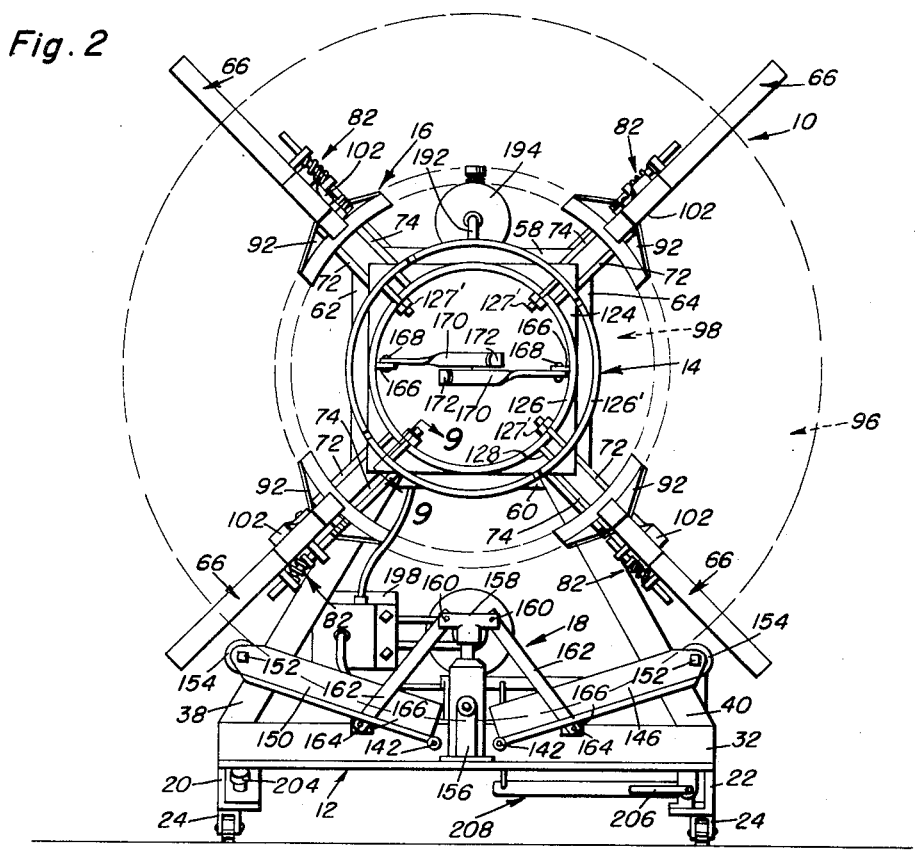
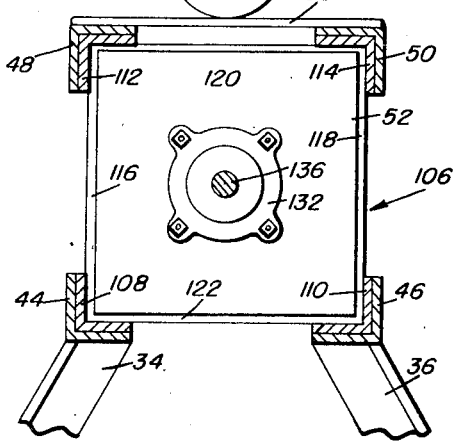
Fig. 5
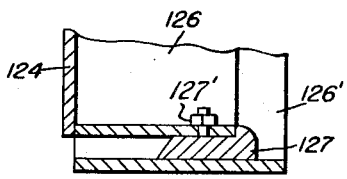
Fig. 9
Charles T. Oglesby
INVENTOR.

Jan. 22, 1957

C. T. OGLESBY 2,778,414

TIRE PULLER ASSEMBLY WITH CIRCUMFERENTIALLY
DISTRIBUTED THRUST MEMBERS

Filed June 7, 1955

Charles T. Oglesby
INVENTOR.

BY *Clarence A. O'Brien
and Harvey B. Jackson*
Attorneys

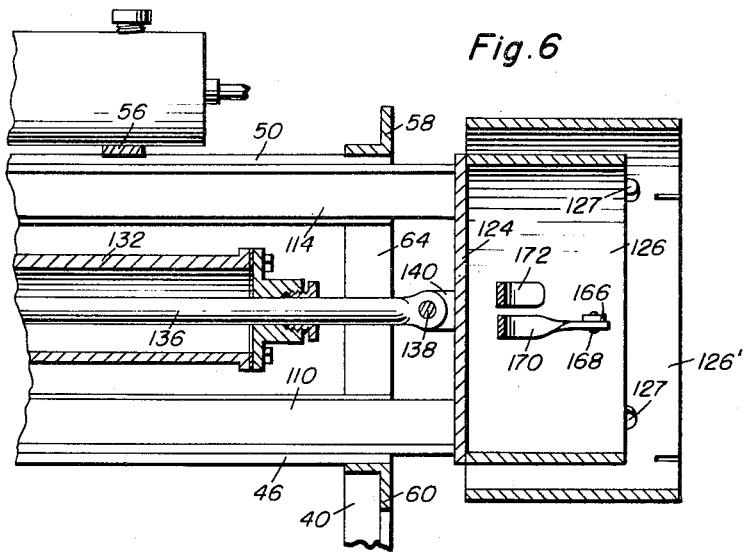
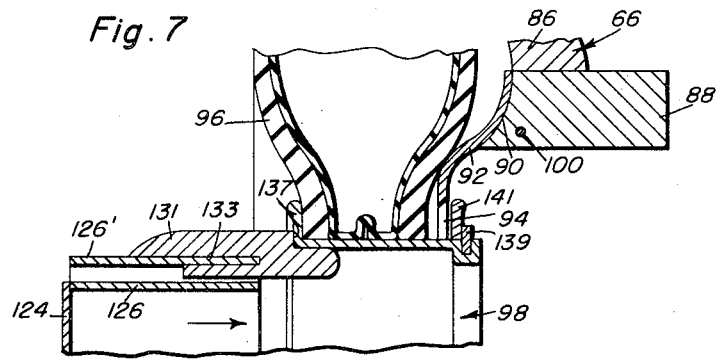
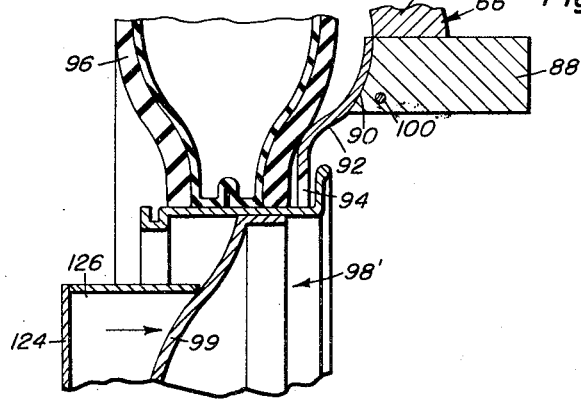
Charles T. Oglesby
INVENTOR.

United States Patent Office 2,778,414
Patented Jan. 22, 1957

2,778,414
TIRE PULLER ASSEMBLY WITH CIRCUMFERENTIALLY DISTRIBUTED THRUST MEMBERS

Charles T. Oglesby, Webb City, Okla.

Application June 7, 1955, Serial No. 513,827

4 Claims. (Cl. 157—1.2)

This invention relates generally to tire handling apparatus and is more particularly concerned with a tire handling device for readily separating generally heavy duty tire and wheel assemblies, such as truck tires, said device including means for readily removing inner tubes from a tire carcass as well as facilitating the inspection and reassembly of the tire wheel assemblies.

A further object of invention in conformance with that set forth above is to provide in a tire handling device of the character set forth means positioning a tire and wheel assembly relatively to a reciprocating power operated ram means engageable with a tire wheel or rim for applying pressure thereto in opposition to a plurality of equidistantly spaced tire abutment means whereby the tire rim may be readily and expeditiously urged away from the tire mounted on said rim.

A further object of invention in conformance with that set forth above is to provide in a device of the character set forth means for engaging opposite inner peripheral bead portions of a tire for aiding in the removal of inner tubes therefrom as well as permitting the ready inspection of the inner carcass portion of said tire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a front elevational view of the novel tire handling apparatus showing in dotted lines the tire and wheel assembly in position thereon;

Figure 5 is an enlarged partial sectional view taken substantially on line 5—5 of Figure 1;

Figure 6 is an enlarged partial sectional view taken substantially on line 6—6 of Figure 3;

Figure 7 is a further enlarged fragmentary sectional view showing a portion of the power operated ram with a rim engaging lug mounted thereon and illustrating the cooperation between said ram and lug relative to one of the tire contacting plates of an abutment arm;

Figure 8 is a view similar to that of Figure 7 illustrating the cooperation between the power ram and abutment plate of the abutment arm for removing a tire from a wheel after a lock ring has been removed therefrom;

Figure 9 is a still further enlarged fragmentary sectional view taken substantially on line 9—9 of Figure 2 illustrating the manner in which the diameter increasing power ram element may be incorporated thereon for utilizing the apparatus with tire and wheel assemblies of larger diameters;

Figure 1:
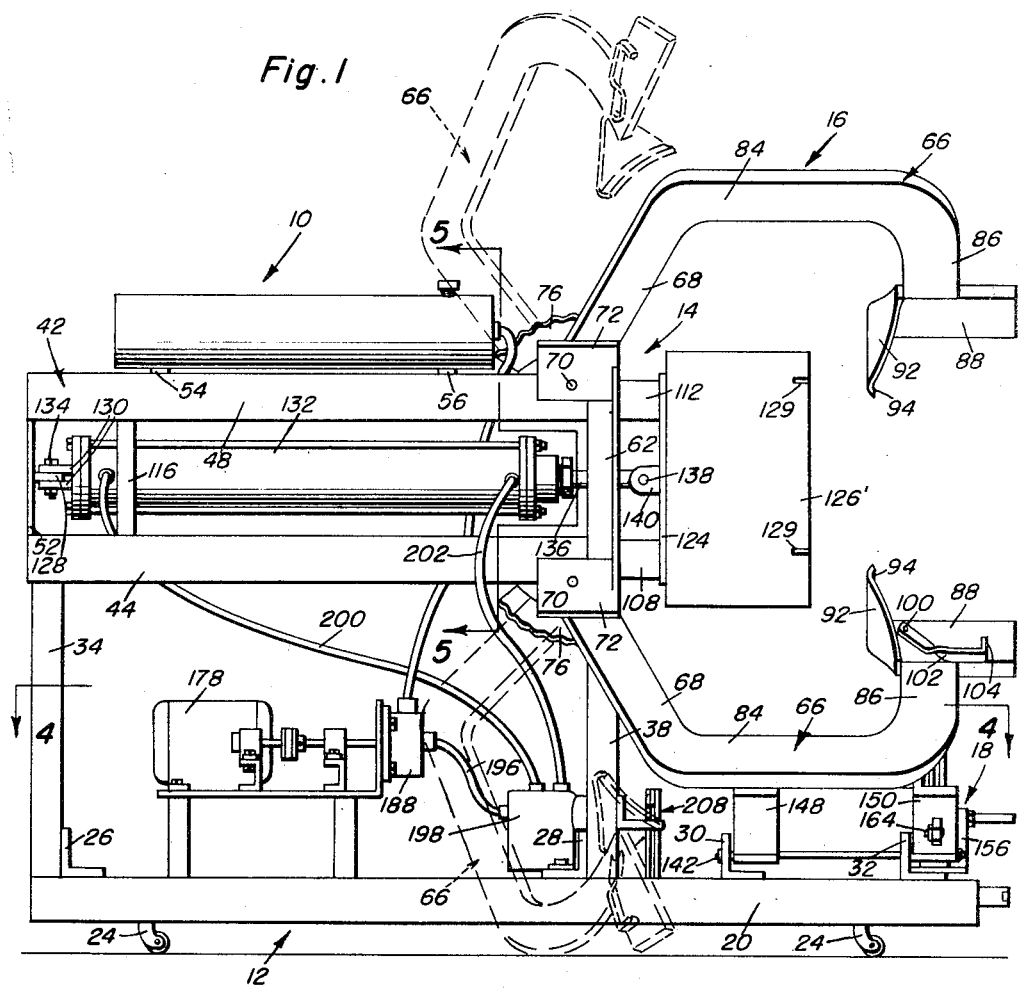
Figure 1 is a side elevational view of the novel tire handling apparatus showing in dotted lines the pivotal movement of the nearest tire abutment arms.

The novel tire handling apparatus is indicated at 10 and includes a support frame 12, a power ram assembly 14, an abutment arm assembly 16, and tire and wheel elevator assembly 18.

The support frame 12 includes a pair of longitudinally extending side angle members 20 and 22 which have secured on a lower flange portion suitable caster wheels 24. Extending transversely across the upper edge of the side members 20 and 22 are angle members 26, 28, 30 and 32, it being understood that these transverse angle members are secured to the side members by means of welding, for example. Extending upwardly in converging relationship from the side rails 20 and 22 adjacent the transverse angle members 26 and 28 are pairs of power ram support legs 34 and 36, and 38 and 40. The power ram support legs are rigidly secured at their upper ends in any suitable manner to a skeletonized rectangular ram guide frame 42 which includes lower longitudinally extending angle members 44 and 46 which are respectively secured to the support legs 34 and 38, and 36 and 40, and upper longitudinally extending angle members 48 and 50. It will be seen in Figure 5, for example, the angle members 44 through 50 are positioned so that the flanges thereof define the outer perimeter of the skeletonized rectangular guide frame 42 of the power ram, the rectangular relationship of said frame being maintained by means of a back plate 52 secured to the rear ends of the members 44 through 50, upper reinforcing straps 54 and 56 extending transversely of members 48 and 50, as well as reinforcing angle members 58 extending transversely across members 48 and 50, member 60 extending transversely across members 44 and 46, member 62 extending between members 44 and 48 on one side of the guide frame 42, and member 64 extending between members 46 and 50 on the opposite side of said guide frame, said members 58 through 64 being secured on the end of the frame 42 opposite the end plate 52.

Secured at each of the four corners of the rectangular guide frame 42 are C-shaped tire abutment arms 66, each of which being identical and accordingly it is believed only necessary to describe one in detail. Said abutment arms 66 include an inner end portion 68 which is pivotally supported on a pivot pin 70 between a pair of spaced supporting plates 72 and 74 which are suitably secured in spaced radially extending relationship on each of the corners of the rectangular guide frame 42. Each of the plates 74 have secured thereon in any suitable manner an arcuate ratchet segment 76 having a radius of curvature coinciding with that of the pivotal abutment arms 66, said segments including a notched edge portion 78 cooperating with the stop element 80 of a manually actuable resiliently urged stop assembly 82 reciprocably supported on the side 84 of the abutment arms 66 whereby means are provided for positioning said abutment arms in an inoperative position as shown by the dotted lines of Figure 1, for example. The abutment arms 66 include extending from the portion 68 thereof a horizontal portion 84 which terminates in a downward and inwardly directed end portion 86. The ends 86 of said abutment arms include a transverse end element 88 which have secured on the inner end portion 90 thereof a triangular shaped abutment plate 92 which includes an elongated lower base portion 94 opposite the end which is attached to element 88, said base portion being readily insertable between the tires indicated at 96, and the tire rims indicated at 98 and 98' of Figures 7 and 8.

Figure 10:
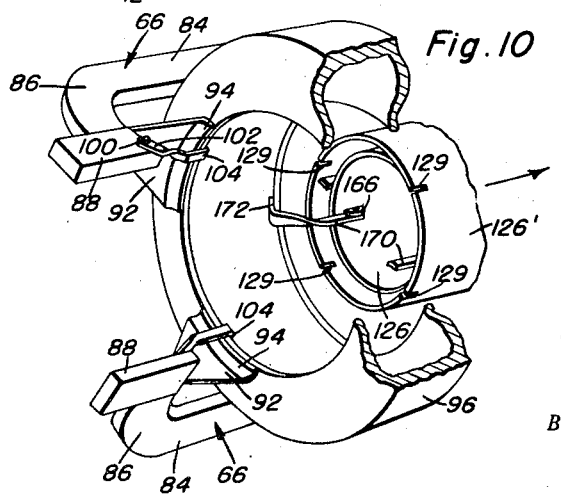
Figure 10 is a perspective view with portions broken away illustrating the manner of utilizing tire spreading means engageable with the inner peripheral bead portion for spreading the same aiding in the removal of inner tubes therefrom and inspection of the tire carcass.
Figure 3:
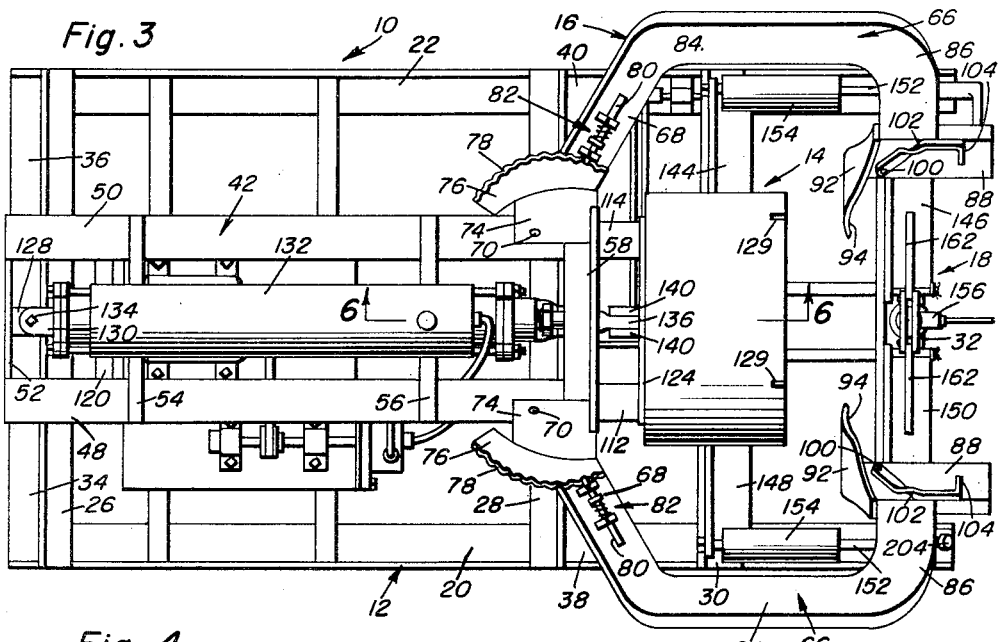
Figure 3 is a top plan view of the novel tire handling apparatus.
Figure 4:
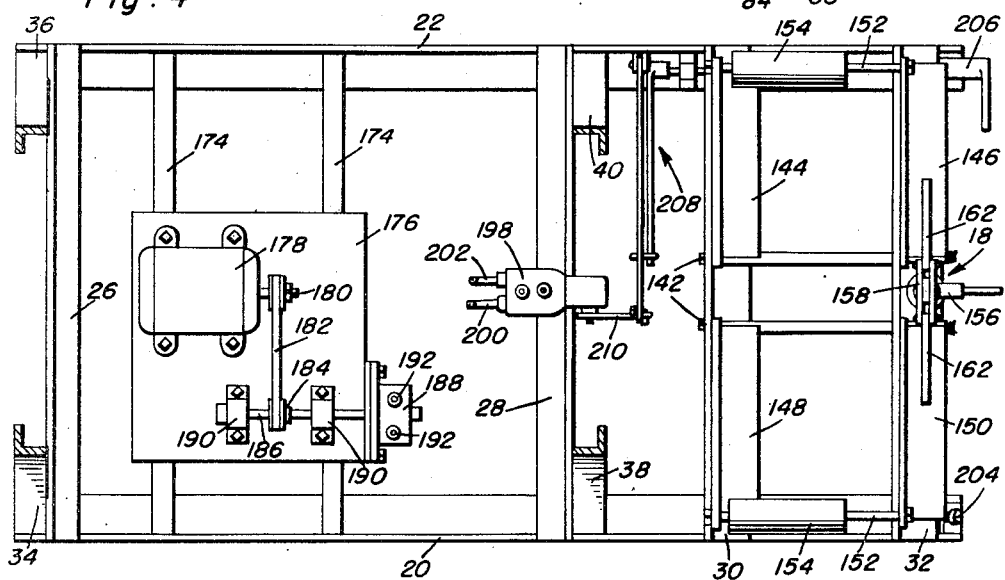
Figure 4 is a sectional view taken substantially on line 4—4 of Figure 1.
Figure 11:
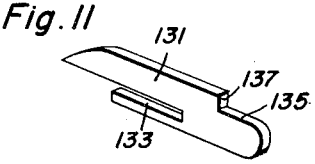
Figure 11 is a perspective view of one of the tire rim engaging lugs adapted to be mounted on a power ram of the device.

Each of the transverse elements 88 and of the abutment arms 66 includes on a suitable transverse pivot pin 100 a pivotal hook element 102 which has a right angular end portion 104 which is extendable within the tire, see Figure 10, and engageable with the inner peripheral portion of the tire for the purpose of aiding in the removing of an inner tube (not shown) and examination of the inner peripheral surface of the tire carcass. The function of these hook elements will be described in greater detail relative to description of operation of the device.

The power ram guide frame 42 reciprocably supports therein a rectangular skeletonized power ram frame 106 which includes longitudinally extending corner forming angle members 108, 109, 112 and 114 which are respectively reciprocably supported within the angle members 44, 46, 48 and 50 of the power ram guide frame 42, the frame members 108 through 112 being retained in their fixed rectangular relationship by means of side reinforcing straps 116 and 118 which extend between members 108 and 112, being secured thereto by means of welding for example, and top and bottom reinforcing strap members 120 and 122 extending transversely between members 112 and 114 and 108 and 110, respectively. The forward ends of the ram frame members 108 through 112 are suitably secured, by welding, for example, to a rectangular plate 124, said plate 124 having centrally secured thereon and extending therefrom a tire rim engaging cylindrical ram head element 126.

The rear plate 52 of the ram guide frame 42 includes an inwardly extending horizontal support ear 128 which has pivotally mounted on opposite sides thereof spaced connecting ears 130 of a double-acting fluid motor cylinder 132 said ears being connected to the support ear 128 by means of a vertical pivot pin 134. The cylinder 132 includes therein a suitable fluid piston (not shown) which is integrally connected to and movable with a piston rod 136 extending from said fluid cylinder and being pivotally connected at 138 to a pair of spaced connecting ears 140 secured at the back of plate 124 of the tire engaging ram.

Thus it is believed readily apparent that reciprocal movement of the cylindrical wheel engaging ram head 126 may be accomplished relative to the ends 86 of the abutment arms 16 and accordingly relative to the abutment plates 92 integrally fixed therewith.

The tire and wheel elevator assembly 18 is supported on the transverse angle members 30 and 32. The upwardly extending flange portions of said members 30 and 32, respectively, each pivotally support at 142 one end of pairs of oppositely disposed short sections of angle members 144, 146 and 148 and 150, the opposite ends of the members 144 and 146 having extending therebetween upwardly extending flange portions thereof a roller support rod 152 which rotatably supports the tire tread engaging roller 154, the members 148 and 150 having extending therebetween similar roller supporting rods 152 which also rotatably supports thereon a tire tread engaging roller 154. Supported on the lower flange of the transverse member 32 is a hydraulic jack 156 which includes a T-shaped head 158 which have pivotally connected thereto at 160 pivotal lever members 162 which are pivotally connected at 164 to suitable connecting ears 166 extending downwardly from elements 146 and 150.

The jack 156 may be actuated in the usual manner and by raising or lowering the head member 158 thereof will raise or lower members 144 and 146, and 148 and 150, and the rollers 154 mounted thereon, whereby the tire and wheel assembly may be rolled onto the rollers 154 when said roller supporting elements 144 through 150 on a substantially horizontal portion, it being understood that the abutment arms 66 will be pivoted rearwardly as seen in the dotted line position of Figure 1, whereafter the jack 156 will be manipulated to raise the tire and rim into a poistion whereafter the tire and wheel assembly, see Figure 2, will be oriented into substantially coaxial alignment with the power ram and cylindrical head 126 thereof.

After the tire and wheel assembly has been properly positioned by the jack assembly 18, the abutment arms 66 may be returned into the tire wall engaging position, as most clearly seen in Figure 8, whereupon the cylindrical head 126 when moved in the direction indicated by the arrow in Figure 8 by means of the hydraulic ram construction will urge the rim 98' away from or out of the tire 96, the abutment plates 92 of the abutment retaining said tire in a fixed position relative to the reciprocating ram structure. The rim construction, such as that shown at 98 of Figure 7 does not include a wheel portion 99, as usually found on smaller wheels, the construction at 98 being of a diameter larger than that of the ram cylinder 126 and accordingly an enlarging ram or drum cylinder 126' may be removably supported concentrically on the drum 126 by means of suitable right angled spacing lugs 127 fixed in the drum 126' and fitting over the drum 126 and abutting the same and bolted thereto as at 127' see Figure 9. The drum 126' may include a plurality of equally spaced edge notched portions 129, said notch portions receiving therebetween the sides of the rim engaging lug element 131 which includes a horizontal slot portion 133 extendable over the sides of the cylindrical drum 126', said rim engaging lug including a forwardly step-down portion 135 which includes a vertical rim engaging abutment portion 137. Spacer lugs 128 may be provided between said drums 126, 126'.

On tire rims such as those disclosed in Figure 7, wherein a lock ring 139 is incorporated therewith, said lock ring may become fixedly secured due to rusting conditions. When this condition occurs the tire rim engaging lug elements 131 may be utilized with the cylindrical ram portion 126' for engaging the tire rim 98 whereupon pressure of the ram in the direction indicated by the arrow in Figure 7 results in urging the tire 96 away from a lock ring 139 and portion 141 of a conventional split rim construction, whereafter said lock ring 139 and split rim 141 may be readily removed from the tire rim 98 whereafter the tire and rim assembly may be reversed to a position similar to that of Figure 8 whereafter the rim 98 may be readily pushed out of the tire 96 in the manner believed to be readily apparent.

The cylindrical ram portion 126 includes on its inner periphery a pair of diametrically opposite horizontal pivot ears 166 each of which pivotally supporting on a suitable pivot pin 168 a pivotal arm element 170 which includes a right angular end portion 172, said portion 172 being engageable on an inner peripheral tire bead portion of a tire 96 as seen in Figure 10, whereupon movement of the cylindrical ram element 126 in the direction indicated by the arrow of Figure 10 results in spreading the tire carcass apart for examination in opposition to the abutment arms 66 which include the pivotal elements 102 and ends 104 for gripping the opposite inner peripheral tire bead portions whereupon the inner tube contained in said tire 96 may be readily removed and reinserted and the tire carcass may be readily examined for damage.

Suitably supported on a pair of transverse strap elements 174 extending between the longitudinal elements 20 and 22 of the frame of the device on a platform member 176 which supports the power source 178 which may be an electric motor or internal combustion engine, said power source including a power shaft 180 including a suitable pulley construction for driving a belt 182 journalled thereover for driving a driven pulley 184 carried on the shaft 186 of a conventional fluid pump 188, said shaft 186 being suitably journalled in support brackets 190 carried on the platform 176. The fluid pump 188 is connected to conduits 192 to a fluid reservoir 194 mounted for example on the ram guide frame 42 extending between the strap elements 54 and 56, said fluid pump being connected to a conduit 196 to a fluid valve control 198. The fluid control means 198 includes valve structure therein, which forms no part of this invention, for directing fluid through fluid conduits 200 and 202 to opposite ends of the fluid cylinder 132, for reciprocating the wheel rim engaging ram. The operation of the power source 178 may be controlled by means of a suitable micro-switch 204, see Figure 2, accessible by the operator of a device from the forward portion of the device. The fluid control element 198 is controlled by means of an actuating lever 206 which is spring urged to a neutral position, the spring not being shown, said lever 206 being engageable by the operator's foot, for example, and being connected through a suitable linkage indicated generally at 208 suitably supported on the frame member 12 to a lever element 210 connected to the fluid control means 198 whereby movement of the lever 206 results in the direction of fluid to opposite ends of the fluid cylinder 132.

Although the description of the device has been confined to describing the manner in which a tire may be removed from the tire rim, it is believed readily apparent that the heretofore described structure may be readily utilized for the purpose of reassembling the tire upon a tire rim in which event the abutment arm 66 may be utilized for retaining the tire 96 in place whereafter a rim such as 98 or 98' may be pushed into place within such tire. Obviously, the tire wall may be collapsed as seen in Figure 7 to permit the re-assembly of the split rim and lock ring construction of the tire rim of the character shown at 98.

Thus, it is believed readily apparent that there has been disclosed tire handling apparatus which fully conforms with the objects of invention heretofore set forth.

Various positional directional terms such as "front," "top," "bottom," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire handling device including a support frame, a vertically adjustable tire and rim elevator means on said frame for supporting a tire and rim assembly for rotation about a horizontal axis, a horizontally reciprocable ram assembly movable into overlying relation to said elevator means, and a plurality of abutment arms carried on fixed pivot means on said frame and rotatable into overlying relation to said elevator means and including portions engageable with a tire of a tire and rim assembly for retaining a tire in a substantially fixed position relative to said ram assembly, said ram assembly including a longitudinally extending ram guide frame carried on said support frame, a ram frame reciprocably supported in said ram guide frame, a fluid motor operatively connected between said ram guide frame and said ram frame, and means for operating said fluid motor, said ram guide frame and said ram frame including elongated overlapping angular frame portions, said ram assembly including a cylindrical tire rim engaging element and a second cylindrical tire rim engaging element fixed concentrically on the tire rim engaging element of said ram assembly.

2. In a tire handling device as set forth in claim 1 wherein said second tire rim engaging element includes a plurality of equidistantly spaced notch portions, a plurality of tire rim engaging lug elements removably supported in said notched portions, each of said lug elements including a vertical abutment portion engageable with a tire rim.

3. A tire handling device including a support frame, a vertically adjustable tire and rim elevator support means on said frame, a horizontally reciprocable ram assembly movable into overlying relation to said elevator support means, and a plurality of arms carried on fixed pivot means on said frame and rotatable into overlying relation to said elevator support means, said arms including coacting devices engageable with opposite sides of one bead of a tire for retaining the tire in a substantially fixed position relative to said ram assembly, and means on said ram assembly engageable with the other bead of a tire for urging the other bead away from the first mentioned bead in response to movement of said ram assembly.

4. The combination of claim 3, said last named means comprising hook elements pivotally mounted on said ram assembly and engageable over the other bead of a tire for urging said other bead away from the first named bead in response to movement of said ram assembly away from said coacting devices.

References Cited in the file of this patent

UNITED STATES PATENTS

| | | |
|---|---|---|
| 1,244,245 | Robertson | Oct. 23, 1917 |
| 2,034,819 | Maulis | Mar. 24, 1936 |
| 2,345,346 | Larson | Mar. 28, 1944 |
| 2,373,975 | Plumeau et al. | Apr. 17, 1945 |
| 2,401,118 | Talley et al. | May 28, 1946 |
| 2,423,652 | Kelley | July 8, 1947 |
| 2,500,285 | Horton et al. | Mar. 14, 1950 |